United States Patent
O'Connell et al.

(10) Patent No.: US 8,095,814 B2
(45) Date of Patent: Jan. 10, 2012

(54) COMPUTING DEVICE POWER MANAGEMENT

(75) Inventors: Brian M. O'Connell, Cary, NC (US);
Keith R. Walker, Austin, TX (US);
Brian J. Snitzer, Lancaster, PA (US);
Jerry J. Price, Hudson, MI (US)

(73) Assignee: International Business Machines Corporation, Armonk, NY (US)

( * ) Notice: Subject to any disclaimer, the term of this patent is extended or adjusted under 35 U.S.C. 154(b) by 1061 days.

(21) Appl. No.: 11/861,999

(22) Filed: Sep. 26, 2007

(65) Prior Publication Data
US 2009/0083560 A1    Mar. 26, 2009

(51) Int. Cl.
*G06F 1/00* (2006.01)
(52) U.S. Cl. ........................ 713/323; 713/300
(58) Field of Classification Search ........... 713/300, 713/320, 323, 324, 330; 455/343.5; 726/3, 726/21
See application file for complete search history.

(56) References Cited

U.S. PATENT DOCUMENTS

| | | | |
|---|---|---|---|
| 5,809,223 A | 9/1998 | Lee et al. | |
| 6,683,605 B1 | 1/2004 | Bi et al. | |
| 7,249,269 B1 * | 7/2007 | Motoyama | 713/320 |
| 7,257,702 B2 * | 8/2007 | Yamada et al. | 713/2 |
| 2003/0018923 A1 | 1/2003 | Kumar et al. | |
| 2003/0191975 A1 * | 10/2003 | Kohara | 713/300 |
| 2004/0032605 A1 * | 2/2004 | Regimbal | 358/1.13 |
| 2005/0273635 A1 * | 12/2005 | Wilcox et al. | 713/320 |
| 2008/0270814 A1 * | 10/2008 | Starr et al. | 713/323 |

OTHER PUBLICATIONS

Softany Software; Monitor Control 2.05; Oct. 8, 2006; http://www.freedownloadscenter.com/Shell_and_Desktop/Screen_Saver_Tools/Monitor_Control.html.
Metaquark; Home Zone; Jul. 30, 2007; http://metaquark.de/homezone/.

* cited by examiner

*Primary Examiner* — Ji H Bae
*Assistant Examiner* — Brandon Kinsey
(74) *Attorney, Agent, or Firm* — Frank C. Nicholas; Robert C. Rolnik; Mark C. Vallone

(57) ABSTRACT

A system, method, and computer usable medium for computing device power management. The method includes identifying a correlation between active states of a computing device and active states of a connected device connected to the computing device through a network, the correlation indicating the desirability of the computing device being active; and providing an active state in the computing device based on the identified correlation. Providing an active state in the computing device based on the identified correlation may include preventing the computing device from entering a power-saving mode based on the identified correlation or waking the computing device.

4 Claims, 14 Drawing Sheets

COMPUTING DEVICE POWER MANAGEMENT

FIELD OF INVENTION

The present invention generally relates to power management. More specifically, the invention relates to methods for determining power management of a computing device and any connected devices.

BACKGROUND OF THE INVENTION

The popularity of home computing devices has continued to increase since the introduction of the first commercially viable models in the 1980s. Over the same period of time, consumers have become more environmentally conscious. In contrast to the increasing number of power-consuming devices in use, consumers are demanding energy-efficient designs for personal computers and their associated devices, such as printers and monitors. Makers of computers and peripheral devices have responded by continually improving the energy efficiency of their machines. Power management features configured to save energy have been incorporated into industry standards. The Advanced Configuration and Power Interface ('ACPI') specification is one such standard that defines common interfaces for hardware recognition, motherboard, and device configuration and power management.

One energy-saving feature common to computing devices (and incorporated into ACPI) is the ability to automatically enter one or more power-saving modes (sometimes known as hibernate, standby, or sleep modes) after a period of inactivity. Identifying inactivity may be performed differently on an individual device according to the device configuration. Depending on the configuration, inactivity may be defined as the absence of a function of operations or user-input on a single machine.

FIG. 1 is a data flow diagram illustrating computing device power management in the prior art. FIG. 1 shows two connected computing devices 102 and 102'. Each computing device 102, 102' individually carries out a power-saving function by determining the power mode (block 106, 106') based on internal system activity 108, 108', including user-input activity and other operations, and internal power settings 110, 110' to arrive at a respective current power mode 112, 112'.

Today, users often employ computing devices in conjunction with one another, typically by connecting the devices over a network. Many systems and networks include specific applications and functions working interdependently in a logical network design.

Problematically, prior art power-saving features found on a computing device do not take into account interdependencies between systems when determining when to enter a power-saving mode. This deficiency may lead to a computing device inappropriately entering a power-saving mode while still needed by a connected device.

For example, a home user may use a laptop computer for work and a desktop computer for games, file storage, stock price monitoring, or audio file streaming. The user may listen to audio files being streamed from the desktop while working on the laptop. Sensing inactivity on the desktop, the desktop may enter a power-saving mode, thereby shutting off the hard drive and disabling the audio streaming function to the chagrin of the user.

Entering a power-saving mode at an undesirable time is frustrating for the user, who must take time to wake the computing device. In some instances, the user may be unaware of the shutdown until the exact moment the disabled function is needed, after which the user will have to wait for the device to wake. Inappropriate hibernation also increases energy consumption, because users frustrated with untimely shut-downs will simply turn off the power-saving function altogether.

Generally, power-saving features of computing devices lack the capability to manage power functions of a particular computing device in dependence upon the particular computing device's interdependencies with related computing devices.

Thus, it would be advantageous to develop systems and methods of power management to overcome these, and other, disadvantages.

SUMMARY OF THE INVENTION

A first embodiment of the present invention includes a computing device having installed upon it software for computing device power management. The computing device includes a processor; a computer memory operatively coupled to the processor; and a communications adapter operatively coupled to the processor and the computer memory, the communications adapter for connecting the computing device through a network to a connected device. The computer memory has disposed within it computer program instructions for identifying a correlation between active states of the computing device and active states of the connected device; and preventing the computing device from entering a power-saving mode based on the identified correlation. The computer program instructions may prevent the computing device from entering the power-saving mode responsive to sensing a shutdown signal.

A second embodiment of the present invention includes a monitoring device for power management of a computing device connected to the monitoring device through a network. The monitoring device includes a processor; a computer memory operatively coupled to the processor; and a communications adapter operatively coupled to the processor and the computer memory, the communications adapter for connecting the monitoring device through a network to the computing device and a connected device. The computer memory has disposed within it computer program instructions for identifying a correlation between active states of the computing device and active states of the connected device; and computer program instructions for waking the computing device from the power-saving mode responsive to identifying the correlation.

A third embodiment of the present invention includes a network device for power management of a computing device. The network device may include a processor; a computer memory operatively coupled to the processor; and a communications adapter operatively coupled to the processor and the computer memory, the communications adapter for connecting the networking device through a network to the computing device and one or more connected devices. The computer memory has disposed within it computer program instructions for identifying a correlation between active states of a computing device and active states of the one or more connected devices; and computer program instructions for waking the one or more connected devices from a power-saving mode responsive to identifying the correlation. The computer program instructions for identifying a correlation may include computer program instructions for determining that the computing device is active by detecting network traffic from the computing device. The computer program instructions for waking the one or more connected devices may include computer program instructions for determining a priority for each connected device and waking the plurality of connected devices in order of priority beginning with the highest priority.

A fourth embodiment of the present invention includes method for power management of a computing device from a monitoring device. The method includes identifying, at the monitoring device, a correlation between active states of the computing device and active states of a connected device, wherein the connected device is connected to the computing device through a network; and responsive to identifying the correlation, waking the computing device from the power-saving mode. The correlation may include first operations in the connected device being dependent upon second operations in the computing device. Identifying the correlation may include checking a configurations file to determine if the connected device has been designated as being dependant on the computing device; detecting that the connected device is active; and detecting that the computing device is in a power-saving mode.

A fifth embodiment of the present invention includes method for power management of a computing device from a network device. The method includes identifying a correlation between active states of a computing device and active states of one or more connected devices, wherein the one or more connected devices are connected to the computing device through the network device; and, responsive to identifying the correlation, waking the one or more connected devices from the power-saving mode. Identifying a correlation may include determining, at the network device, that the computing device is active by detecting network traffic from the computing device. Waking the one or more connected devices from the power-saving mode may further include determining a priority for each individual connected device of the plurality of connected devices; and waking the plurality of connected devices from the power-saving mode in order of priority beginning with the highest priority.

The foregoing embodiment and other embodiments, objects, and aspects as well as features and advantages of the present invention will become further apparent from the following detailed description of various embodiments of the present invention. The detailed description and drawings are merely illustrative of the present invention, rather than limiting the scope of the present invention being defined by the appended claims and equivalents thereof.

DETAILED DESCRIPTION OF THE PRESENT INVENTION

Figure 1:
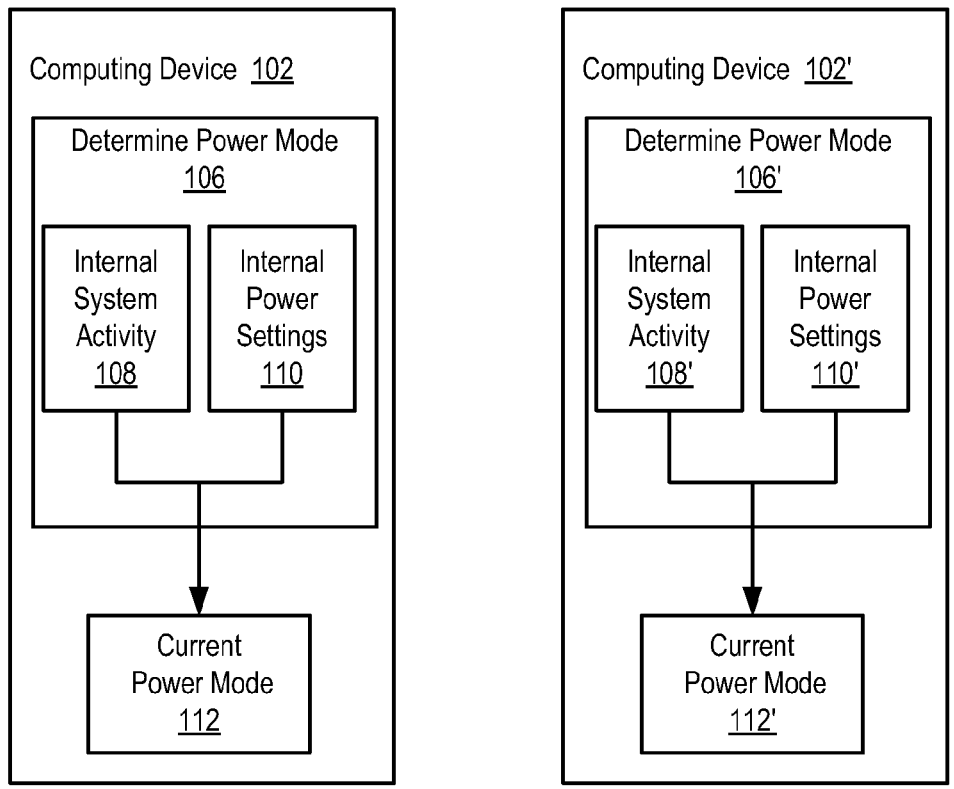
FIG. 1 illustrates a prior art method for computing device power management.
Figure 2:
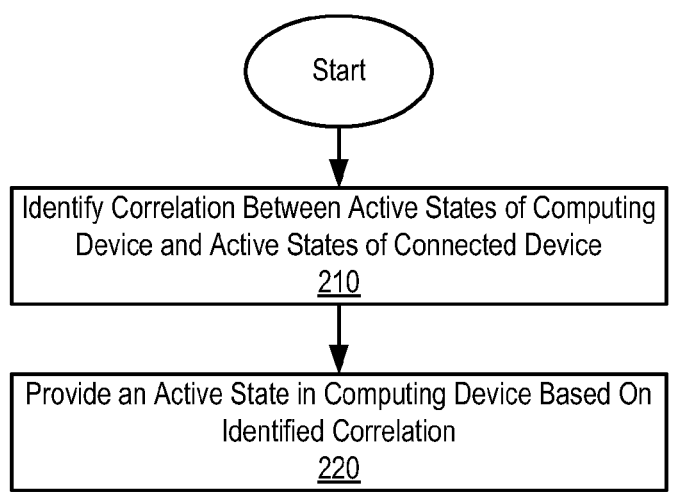
FIG. 2 illustrates one embodiment of a method for computing device power management in accordance with one aspect of the invention.

FIG. 2 illustrates one embodiment of a method for power management of a computing device in accordance with one aspect of the invention. The method begins at 210 by identifying a correlation between active states of the computing device and active states of a connected device. The connected device may be any related device used in conjunction with the computing device that is connected to the computing device through a network. A device is in an active state when it meets an activity threshold required by the device to prevent entering a power-saving mode due to the device's inactivity. Thus, a device is active unless it is in a power-saving mode.

Generally, the correlation between the active states indicates the desirability of the computing device or one of the connected devices being in an active state. The correlation may include the computing device being dependent upon a connected device, a connected device being dependent upon the computing device, a pattern of use that indicates the computing device and the connected device are used simultaneously, and so on. Identifying the correlation may include various detection steps to detect these aspects of the correlation, as described in greater detail below with reference to FIG. 6B. Identifying the correlation may further include the step of detecting whether the computing device or one or more connected devices are in a power-saving mode.

Step 220 includes providing an active state in the computing device based on the identified correlation. In one embodiment of the presently disclosed invention, providing an active state includes preventing the computing device from entering a power-saving mode. In other embodiments, providing an active state includes waking the computing device or one or more connected devices.

In one embodiment, step 210 and step 220 are carried out on the computing device. Alternatively, either or both steps may be carried out on one or more connected devices, a second computing device with no correlation to the computing device, or a network device connecting the computing device with one or more connected devices, as is discussed in greater detail below. The order of method steps as described herein does not necessarily limit the order in which the steps can be performed.

Figure 3A:
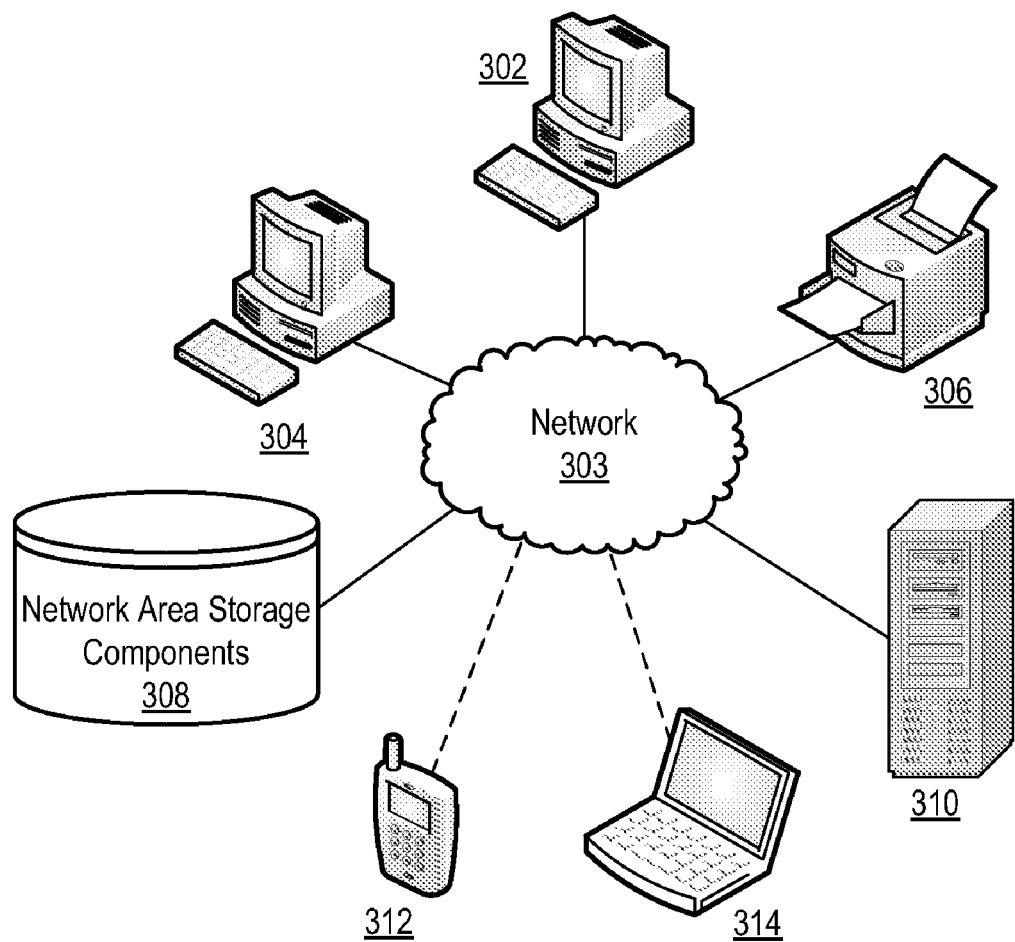
FIGS. 3A-B illustrate embodiments of a system for computing device power management in accordance with one aspect of the invention.
Figure 3B:
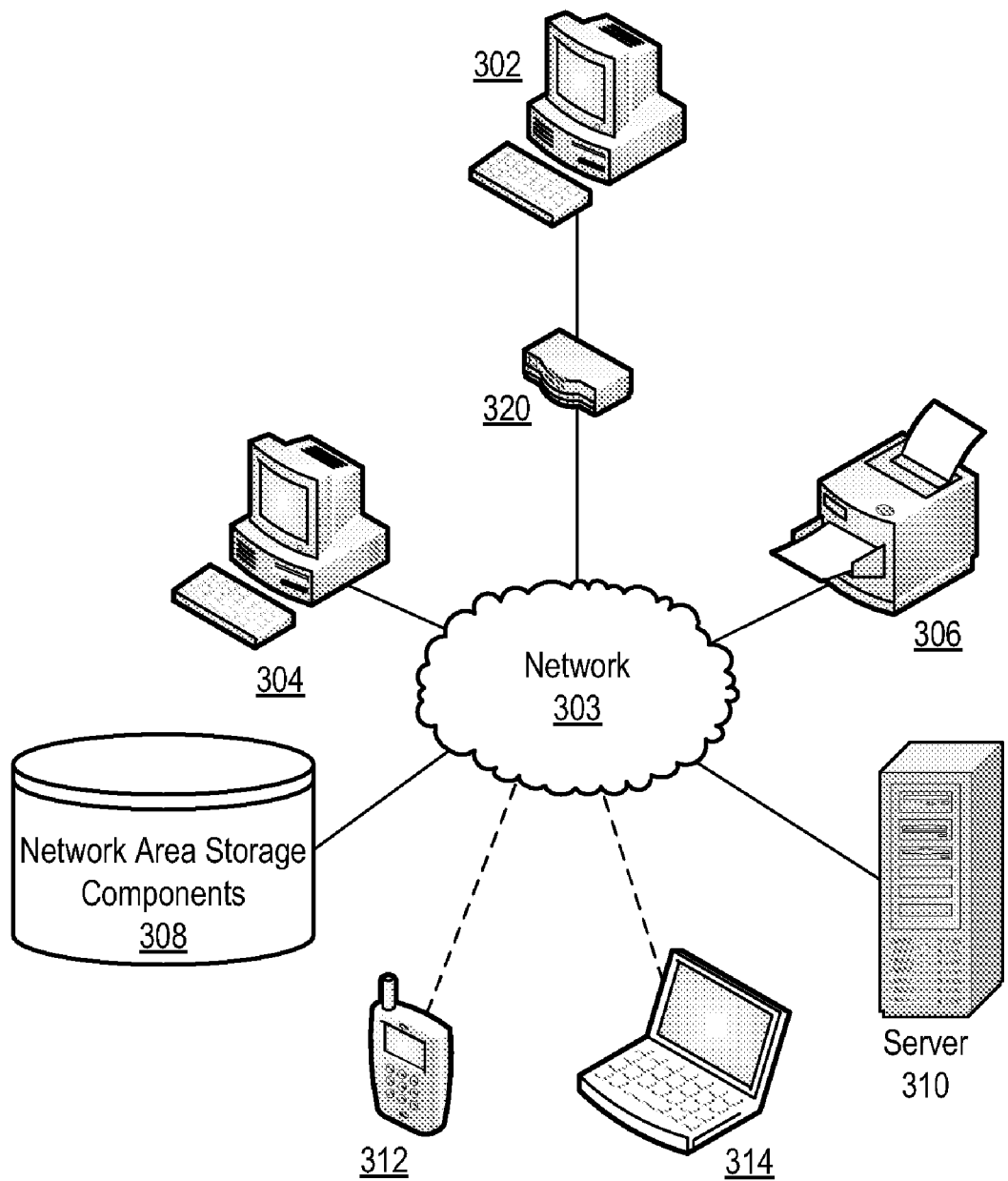

FIGS. 3A and 3B illustrate an embodiment of a system for computing device power management in accordance with one aspect of the invention. The system of FIG. 3A includes a computing device 302 connected to connected devices 304-314 through a network 303. Computing device 302 is a desktop computer. Exemplary connected devices may include a second desktop computer 304, a printer 306, network storage components 308, a server 310, a smart phone 312, and a laptop computer 314. Network 303 may include, alone or in combination, one or more local area networks ('LANs'), wide area networks ('WANs'), wired or cellular telephone networks, intranets, or the Internet. Second desktop computer 304, printer 306, network storage components 308, and server 310 connect to network 303 via a wired connection. Smart phone 312 and laptop computer 314 connect to network 303 via a wireless connection.

The system of FIG. 3B includes the same connected devices as FIG. 3A. However, the connected devices 304-314 of FIG. 3B are connected to computing device 302 through network device 320, which may be, for example, a hub, a router, a residential gateway, or any other network device suitable for use in the system of the present invention.

Any of the connected devices 304-314 could also serve as a computing device. The devices disclosed in FIGS. 3A and 3B are provided for illustration and not for limitation. The computing device and connected devices of the invention could be implemented as any viable computing device including logic and memory as will occur to one of ordinary skill in the art, including devices where logic is implemented as field-programmable gate arrays ('FPGAs'), application-specific integrated circuits ('ASICs'), and the like.

Figure 4:
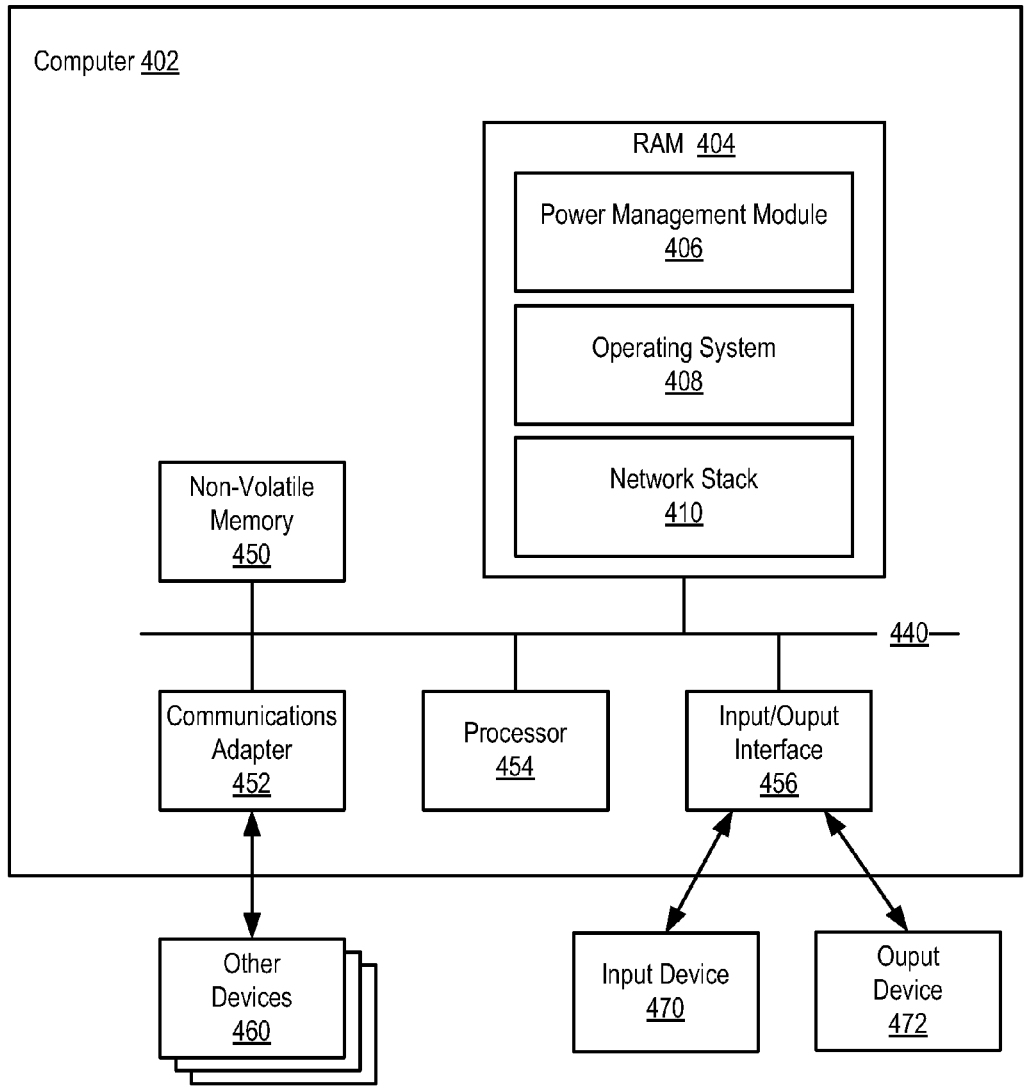
FIG. 4 illustrates a block diagram of an exemplary computer for computing device power management in accordance with one aspect of the invention.

Computing device and the connected device disclosed herein may be implemented as computers. Embodiments of the presently disclosed invention are implemented to some extent as software modules installed and running on computers. FIG. 4 sets forth a block diagram of an exemplary computer 402. Computer 402 includes at least one computer processor 454 as well as a computer memory, including both volatile random access memory ('RAM') 404 and some form or forms of non-volatile computer memory 450 such as a hard disk drive, an optical disk drive, or an electrically erasable programmable read-only memory space (also known as 'EEPROM' or 'Flash' memory). The computer memory is connected through a system bus 440 to the processor 454 and to other system components. Thus, the software modules are program instructions stored in computer memory.

An operating system 408 is stored in computer memory. Operating system 408 may be any appropriate operating system such as Windows XP, Windows Vista, Mac OS X, UNIX, LINUX, or OS/2 from International Business Machines Corporation (Armonk, N.Y.). A network stack 410 is also stored in memory. The network stack 410 is a software implementation of cooperating computer networking protocols to facilitate network communications. Also stored in computer memory is a power management module 406.

In some embodiments, the power management module 406 includes computer readable code for identifying a correlation between active states of the computing device and active states of a connected device connected to the computing device through a network; and computer readable code for preventing the computing device from entering a power-saving mode. In other embodiments, the power management module 406 includes computer readable code for waking the computing device or the connected device from a power-saving mode responsive to identifying the correlation.

In preferred embodiments, power management module 406 includes one or more software modules incorporated in the operating system 408. However, power management module 406 may also be implemented above the operating system in the software stack, in hardware, in firmware (such as in the BIOS), or in any other manner as will occur to those of ordinary skill in the art.

Computer 402 also includes one or more input/output interface adapters 456. Input/output interface adapters 456 may implement user-oriented input/output through software drivers and computer hardware for controlling output to output devices 472 such as computer display screens, as well as user input from input devices 470, such as keyboards and mice.

Computer 402 also includes a communications adapter 452 for implementing data communications with other devices 460. Communications adapter 452 implements the hardware level of data communications through which one computer sends data communications to another computer through a network.

Figure 5:
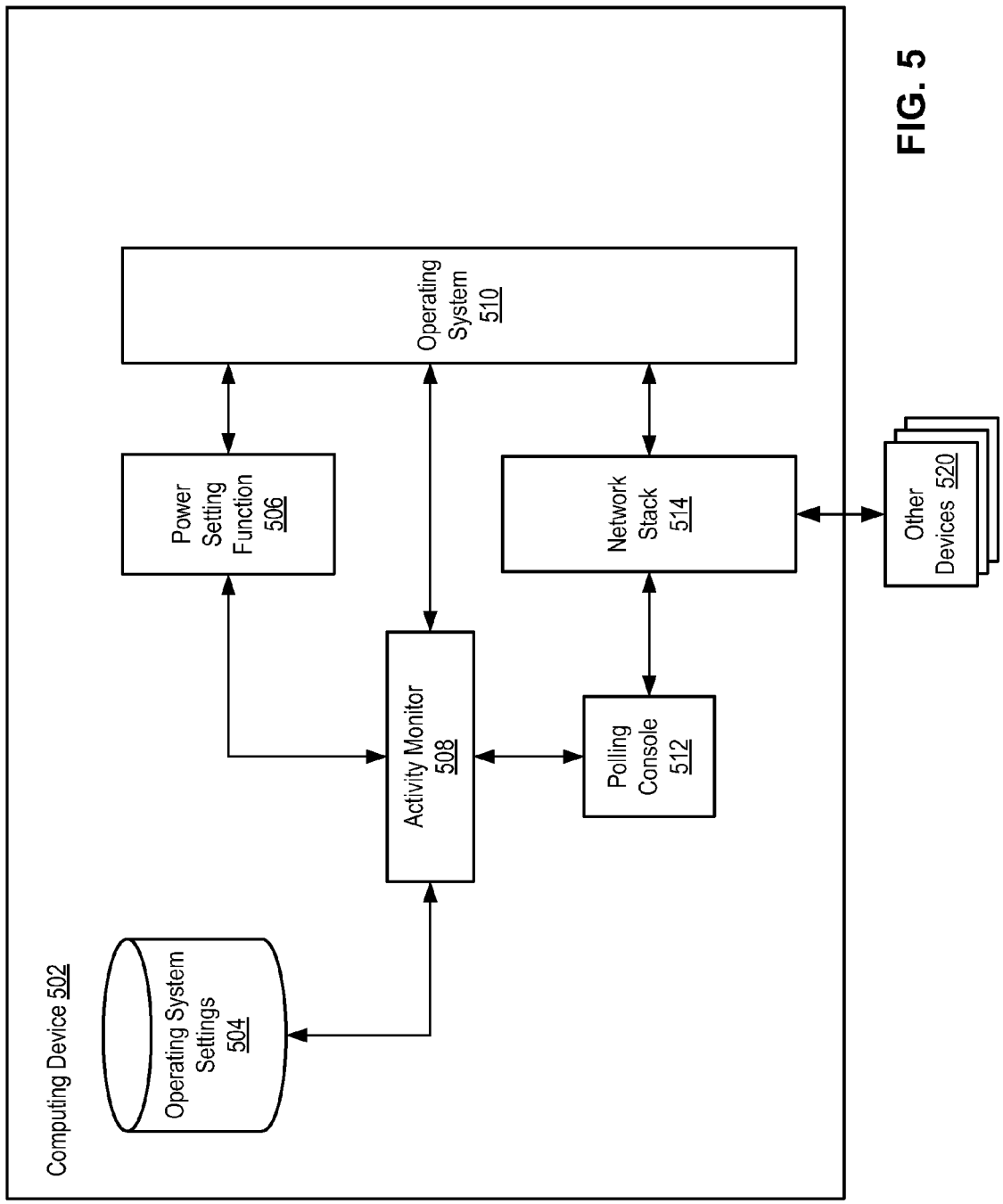
FIG. 5 illustrates a software architecture for computing device power management in accordance with one aspect of the invention.

For further explanation, FIG. 5 sets forth a data flow diagram illustrating an exemplary software architecture for computing device power management. The software architecture of FIG. 5 includes an operating system 510 (see FIG. 4 above). Power setting function 506 is available to operating system 510 to initiate internal power setting changes, such as entering a power-saving mode. Activity monitor 508 listens to operating system 510 to monitor the system activity level of the computing device 502. Operating system settings 504 is a data store containing threshold configuration data. After communicating with the operating system settings 504 to obtain the inactivity threshold configuration data, activity monitor 508 may be configured to make a binary decision as to whether or not an inactivity threshold has been met.

In one embodiment, if an inactivity threshold has been met, then activity monitor 508 queries a polling console 512 for any system interdependencies. If no interdependencies exist, control is passed to the operating system 510 to initiate a power-saving mode via power setting function 506. In other embodiments, communications between activity monitor 508 and polling console 512 may inform polling console 512 that an activity threshold has been met.

Polling console 512 identifies and stores any system interdependencies that affect power settings on computer 502 or any related devices. For example, polling console 512 identifies interdependencies that prohibit the computing device from entering a power saving mode or that require waking a computing device or a connected device. Polling console 512 then stores the interdependencies. In some embodiments, polling console 512 may also communicate with other devices 520 to determine if the other devices 520 are active.

Polling console 512 may obtain information from other devices 520 by polling similar polling console modules on the other devices 520, which then return the information. Alternatively, each similar polling console module on each of the other devices 520 may independently alert all devices on which that device depends. Polling console 512 may send a Wake on LAN signal to the device in response to determining a connected device is inactive or in response to determining a related device has become active.

Polling console 512 may also contain a graphical user interface ('GUI') component. The GUI component may enable users to enter system interdependencies by typing on a keyboard and manipulating displayed graphical elements with a mouse.

Polling console 512, along with operating system 510, effect communications with other devices 520 through network stack 514. Communications may be implemented via TCP/IP, UDP, WAP, or any other suitable communications protocol as will occur to one of ordinary skill in the art and may take place on a specific port, such as, for example, port 6300. Communications may also be encrypted or require authentication. In some implementations, communications may only be accepted from or sent to trusted devices, as verified by MAC address for example.

Some embodiments of the present invention may be implemented using limited devices, such as, for example, networking devices. These limited devices may be logically similar to the computing device illustrated above with respect to FIGS. 4 and 5, but with more limited functionality. For example, an exemplary network device may lack an operating system and elements of internal power control, such as an activity monitor or power settings functions, and may implement functionality of the polling console in hardware or firmware.

FIGS. 6A-9B illustrate various aspects of the presently disclosed invention. In each embodiment, upon the identification of a correlation between a computing device and one or more connected devices, one of the devices is prevented from entering a power-saving mode or is restored from a power-saving mode (referred to herein as 'waking' the device). The correlation typically includes a relationship between the devices indicating that an active device is desirable. Often, the correlation also includes the status of one of the devices being active or inactive.

Preventing Initialization of Power-Saving Mode

Figure 6A:
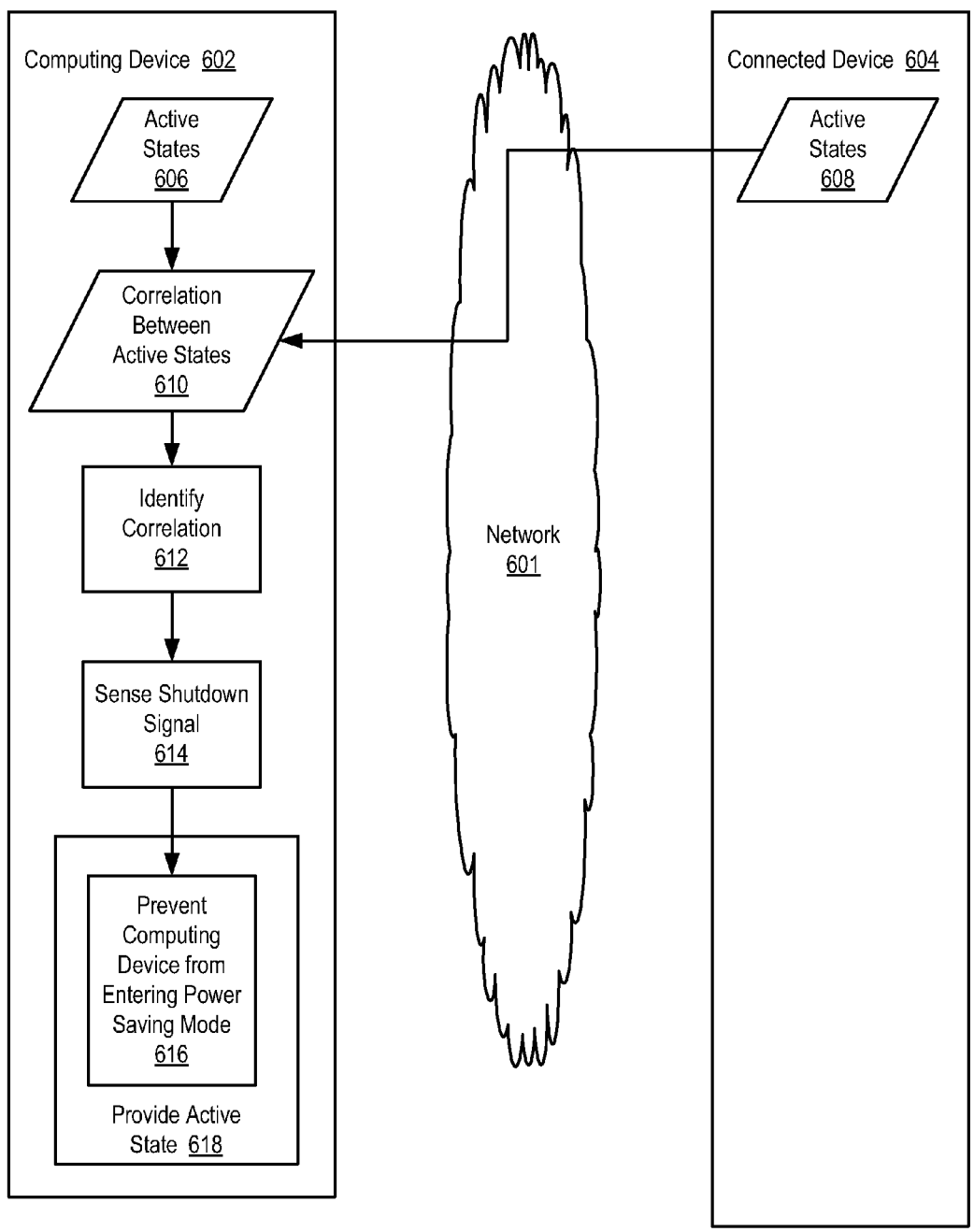
FIGS. 6A-B illustrate another embodiment of a method for computing device power management in accordance with one aspect of the invention.

FIG. 6A is a data flow diagram illustrating one embodiment for a method of computing device power management in accordance with one aspect of the invention. The method of FIG. 6A includes identifying a correlation 610 between active states of the computing device 606 and active states of a connected device 608 (block 612), wherein the connected device 604 is connected to the computing device 602 through a network 601. The method also includes providing an active state in the computing device based on the identified correlation (block 618). In the method of FIG. 6A, providing an active state in the computing device (block 618) includes preventing the computing device from entering the power-saving mode (block 616). Preventing the computing device from entering the power-saving mode (block 616) may be accomplished by setting an indicator in a configurations file or other programming methods well known in the prior art.

As shown, the step of preventing the computing device from entering the power-saving mode (block 616) may be carried out responsive to sensing a shutdown signal (block 614), such as a call from the activity monitor 508 or operating system 510 to initiate a power-saving mode via power setting function 506 (from FIG. 5). Alternatively, the step of preventing the computing device from entering the power-saving mode may be carried out by periodically updating a configurations file.

Figure 6B:
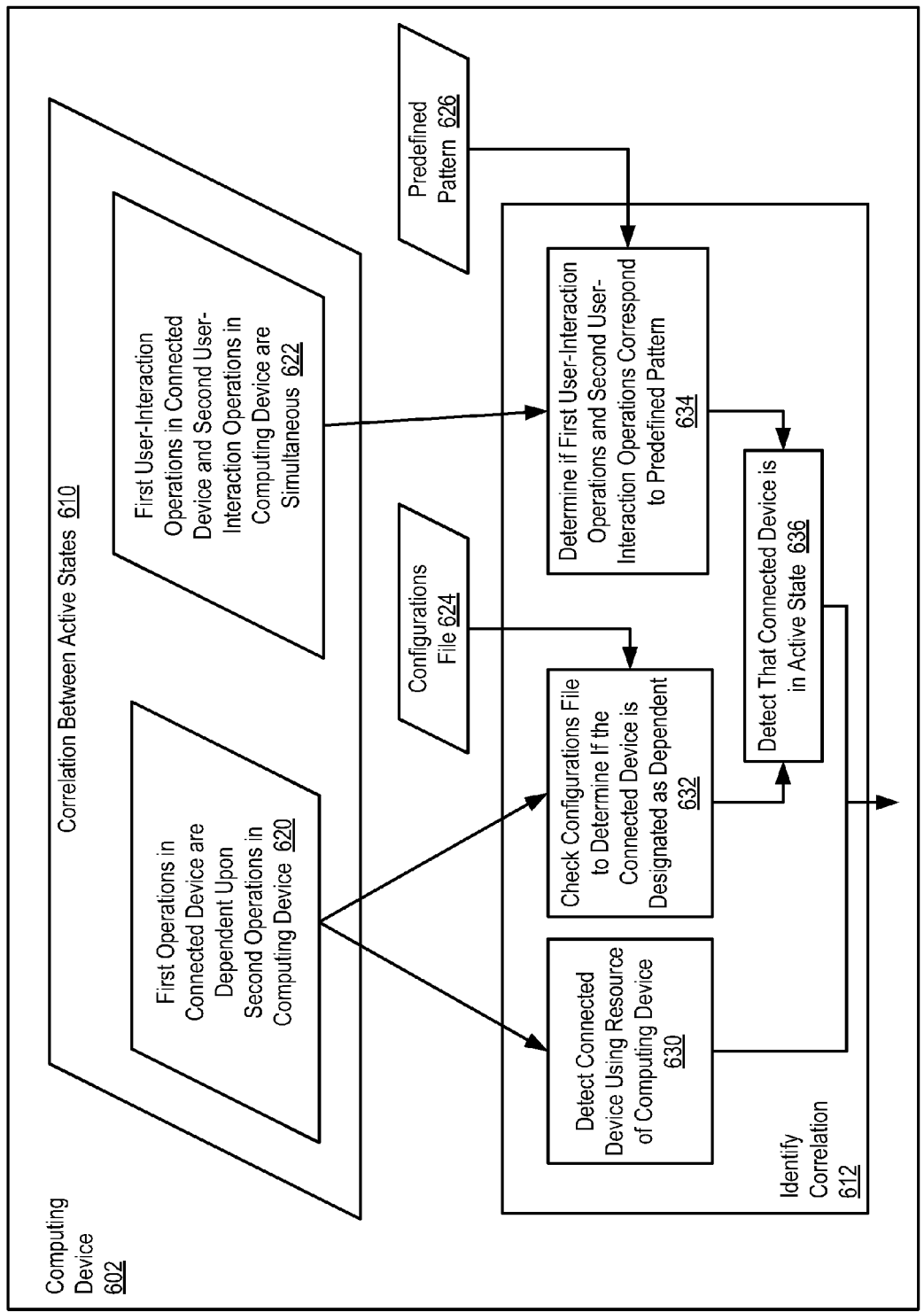

FIG. 6B illustrates identifying a correlation in accordance with one aspect of the invention. In one implementation, the correlation between active states 610 includes first operations in the connected device being dependent upon second operations in the computing device (block 620). Identifying correlation 620 (block 612) may be carried out by detecting the connected device using a resource of the computing device (block 630). For example, operations relating to a music player application in a connected device may be dependent upon music files being streamed from a computing device. Identifying the correlation may be carried out by detecting operations related to remote streaming.

Alternatively, identifying correlation 620 (block 612) may be carried out by checking a configurations file 624 to determine if the connected device has been designated as being dependant on the computing device (block 632). The designation may be input by the user, selected automatically by the computing device, or prompted by communications from the dependent connected device. Identifying correlation 620 may further include detecting that the connected device is in an active state (block 636), as described above.

In a second implementation, the correlation between active states 610 includes, for a particular user, first user-interaction operations in the connected device being simultaneous with second user-interaction operations in the computing device (block 622). Simultaneous use is defined here to include alternating use of two or more devices over a period of time longer than the time necessary to exceed an inactivity threshold for one of the devices, but remaining exclusively on one device between alternations for a time period shorter than would be practical to wake the remaining device(s). For example, a user may be in the habit of working simultaneously on two computers: a lightweight wireless laptop for writing text for a presentation and a powerful workstation for designing graphics for the presentation. The user may alternate between writing a section of text and then designing graphics to accompany the text. Although one device is not dependent upon the other, use of the two devices is related.

In the second implementation, identifying correlation 622 (block 612) may be carried out by determining if the first user-interaction operations and the second user-interaction operations correspond to a predefined pattern 626 (block 634); and detecting that the connected device is in an active state (block 636), as described above. Determining if the first user-interaction operations and the second user-interaction operations correspond to a predefined pattern 626 (block 634) may be implemented through the use of a heuristic. Determining if the first user-interaction operations and the second user-interaction operations correspond to a predefined pattern 626 (block 634) may also be carried out by comparison of an operations log to predefined pattern templates.

Waking a Computing Device

Figure 7A:
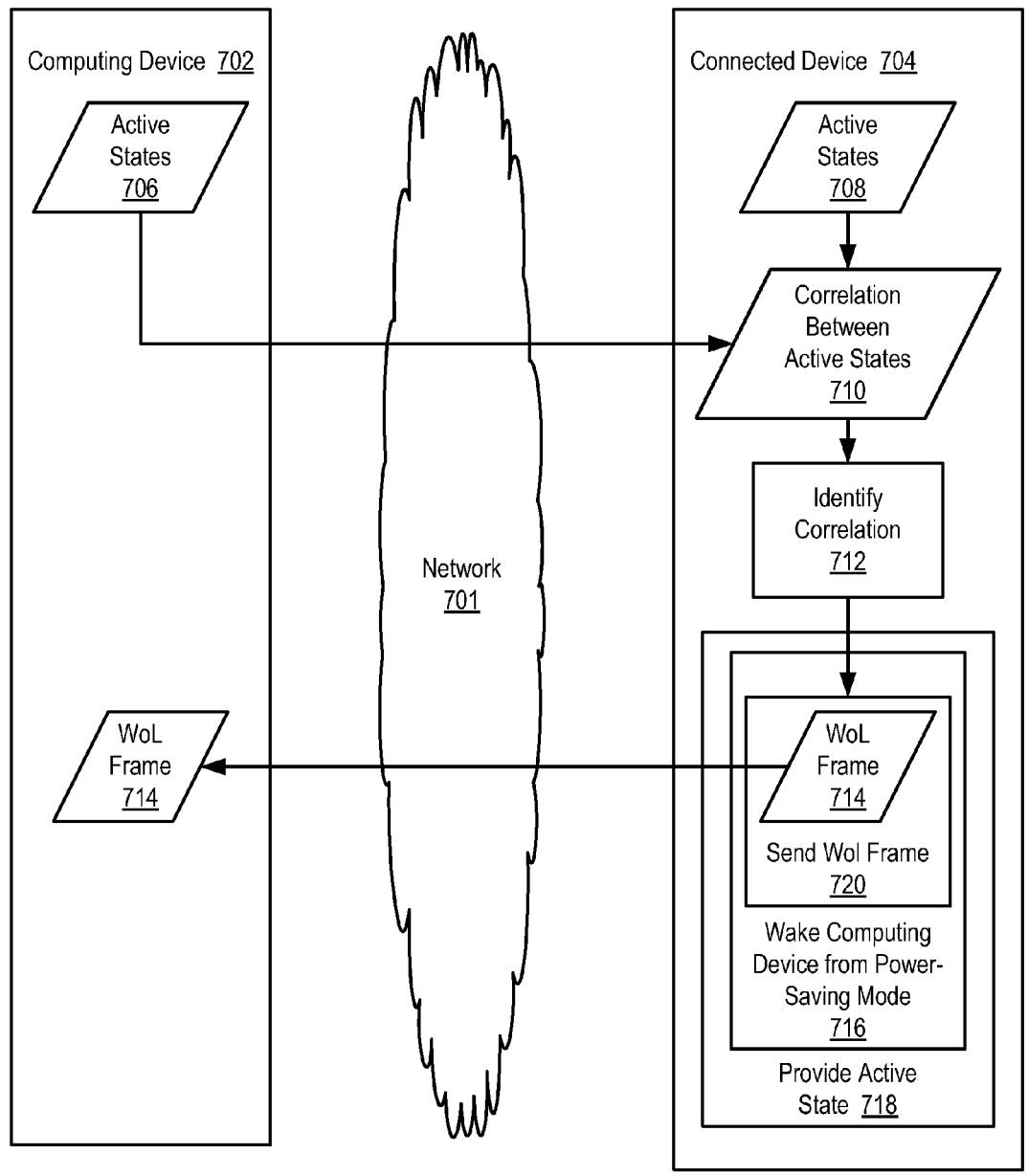
FIGS. 7A-D illustrate another embodiment of a method for computing device power management in accordance with one aspect of the invention.

FIG. 7A is a data flow diagram illustrating one embodiment for a method of computing device power management in accordance with one aspect of the invention. The method of FIG. 7A includes identifying a correlation 710 between active states of the computing device 706 and active states of a connected device 708 (block 712). The connected device 704 is connected to the computing device 702 through a network 701.

The method further includes providing an active state (block 718). In the method of FIG. 7A, the step of providing an active state (block 718) is carried out by, responsive to identifying the correlation (block 712), waking the computing device 702 from the power-saving mode (block 716).

Waking the computing device 702 from the power-saving mode (block 716) may be implemented by sending a Wake on LAN ('WoL') frame 714 or similar signal to the computing device 702 (block 720). Generally, the computing device 702 has been shut down with power reserved for the network card. The network card listens for a specific packet. Typically, the packet is a UDP packet broadcast on the broadcast address for that particular subnet or the entire LAN, but other protocols may be used. In the alternative, the packet may be sent to a specific network address.

In this implementation, the packet is a broadcast frame. The listening computer receives this packet, checks it for the correct information, and then boots if the packet is valid. The packet may be transmitted over port 0, 7, 9, or any other port as might be desirable to one of skill in the art. The packet contains data including a defined constant followed by a particular number of repetitions of the computer's MAC address. The data may also contain a password field.

Figure 7B:
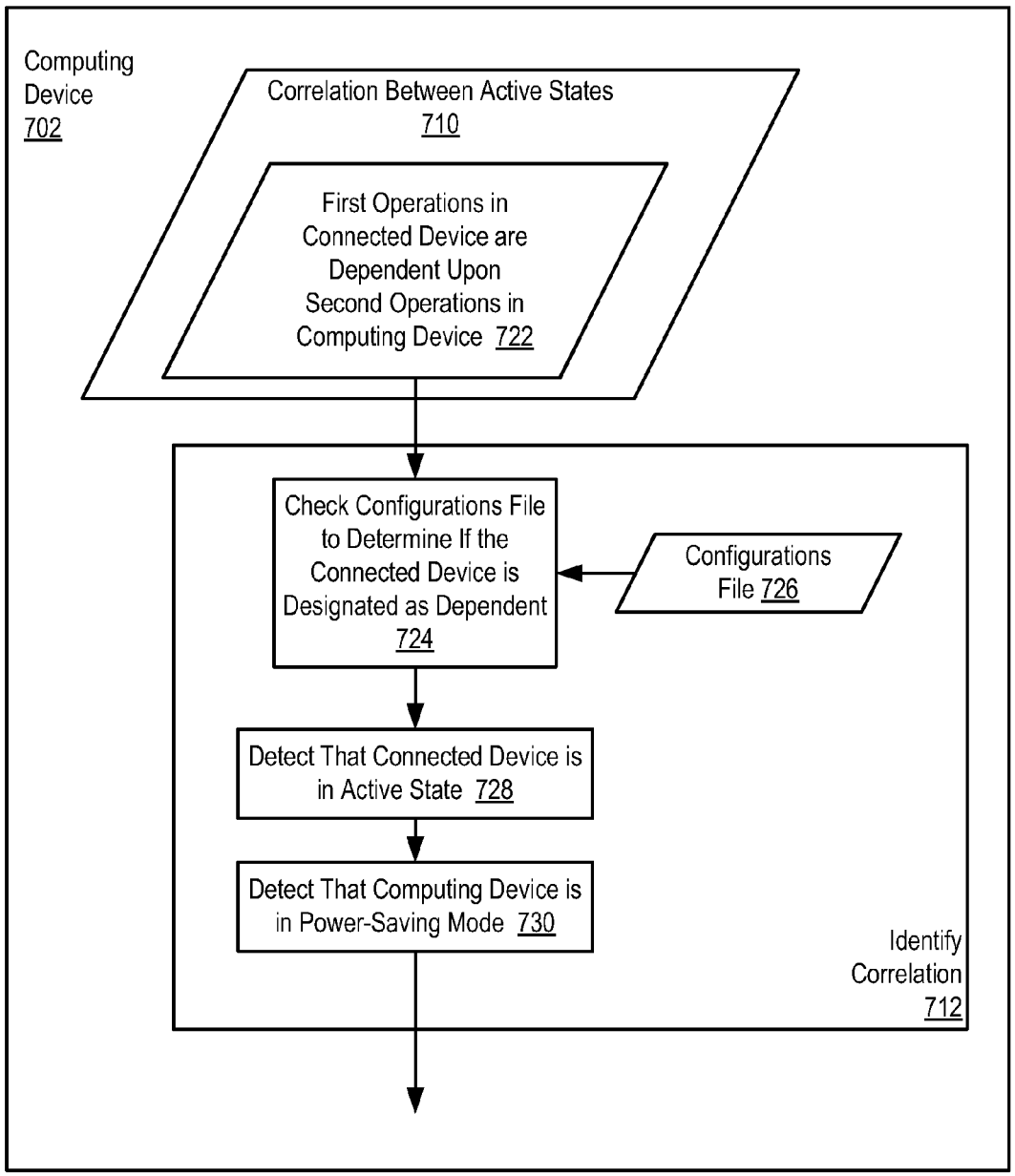

FIG. 7B illustrates identifying a correlation in accordance with one aspect of the invention. In one implementation, the correlation between active states 710 includes first operations in the connected device being dependent upon second operations in the computing device (block 722). Identifying correlation 722 (block 712) includes checking a configurations file 726 to determine if the connected device has been designated as being dependant on the computing device (block 724).

Identifying correlation 722 (block 712) further includes detecting that the connected device is in an active state (block 728). Identifying correlation 722 (block 712) may further include detecting that the computing device is in a power-saving mode (block 730). The step of identifying a correlation may also be performed without detecting that the computing device is in a power-saving mode, in which case the computing device ignores a wake signal if not in a power-saving mode.

In the method of FIGS. 7A and 7B, the step of identifying a correlation 710 between active states of the computing device 706 and active states of a connected device 708 (block 712) is executed entirely on the connected device 704. In the alternative, the method of FIG. 7A may be partially executed on the computing device.

Figure 7C:
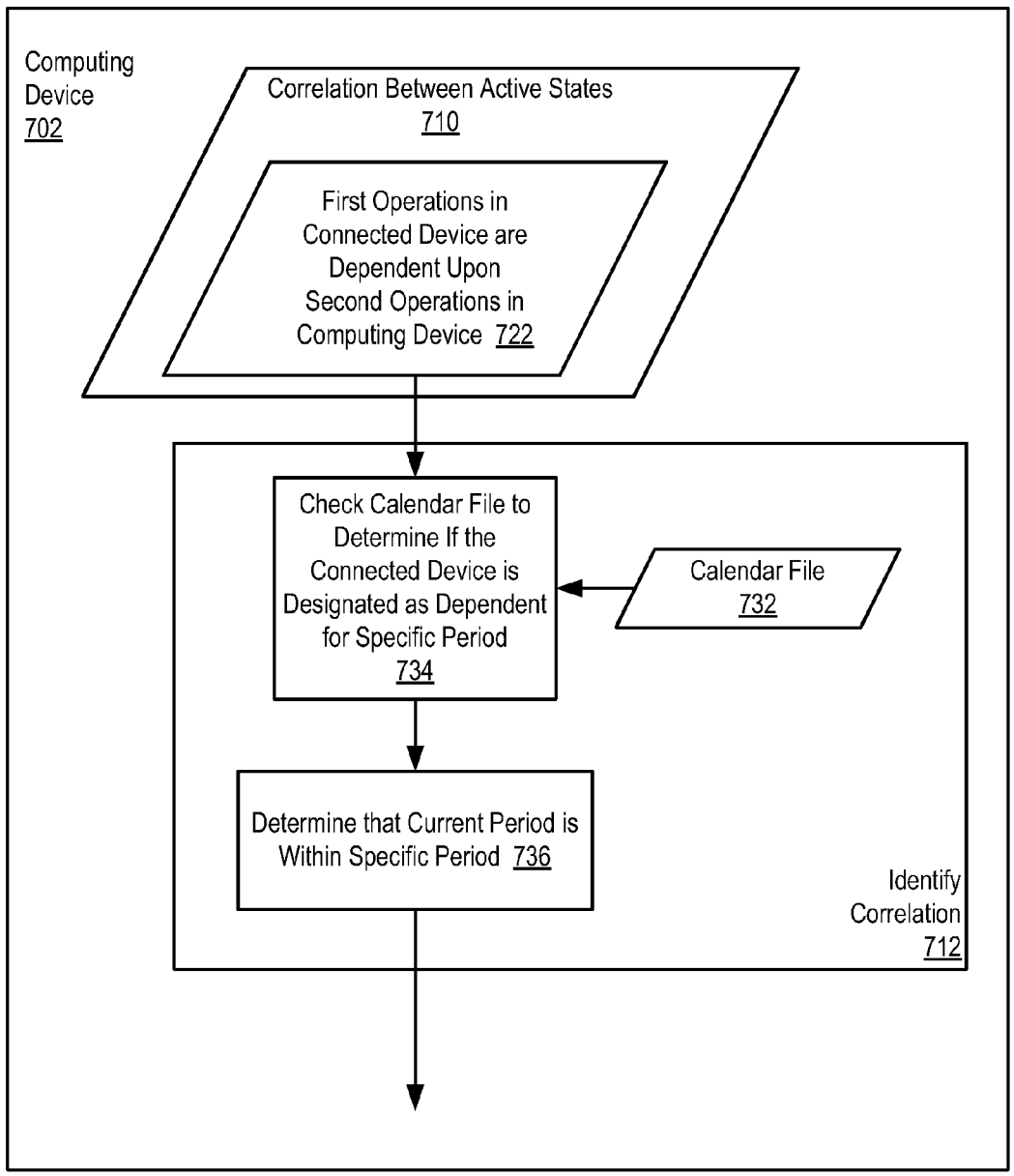

FIG. 7C illustrates identifying a correlation in accordance with one aspect of the invention. Some computing tasks are set to occur regularly, such as, for example, tasks associated with routine maintenance or data backup. In the present invention, a calendar file may include scheduled operations and connected devices which may be needed for the scheduled operations. Time-dependent correlations may be identified from these calendar files.

In FIG. 7C, future dependencies may be incorporated in a correlation. Thus, the correlation between active states 710 includes first operations in the connected device being dependent upon second operations in the computing device (block 722), wherein the operations are scheduled for a time in the future. Identifying correlation 722 (block 712) includes checking a calendar file 732 to determine if the connected device 704 has been designated as being dependant on the computing device 702 for a specific period (block 734). Identifying correlation 722 (block 712) further includes, responsive to determining the connected device has been designated as being dependant on the computing device for a specific period, determining that the current period is within the specific period (block 736). The calendar file 732 may be created using a graphical user interface specific to scheduling dependencies of connected devices according to the present invention, or alternatively may be created automatically from data imported from data stores associated with other scheduling applications, or alternatively may be created automatically by querying a history of the timing of prior dependencies.

Figure 7D:
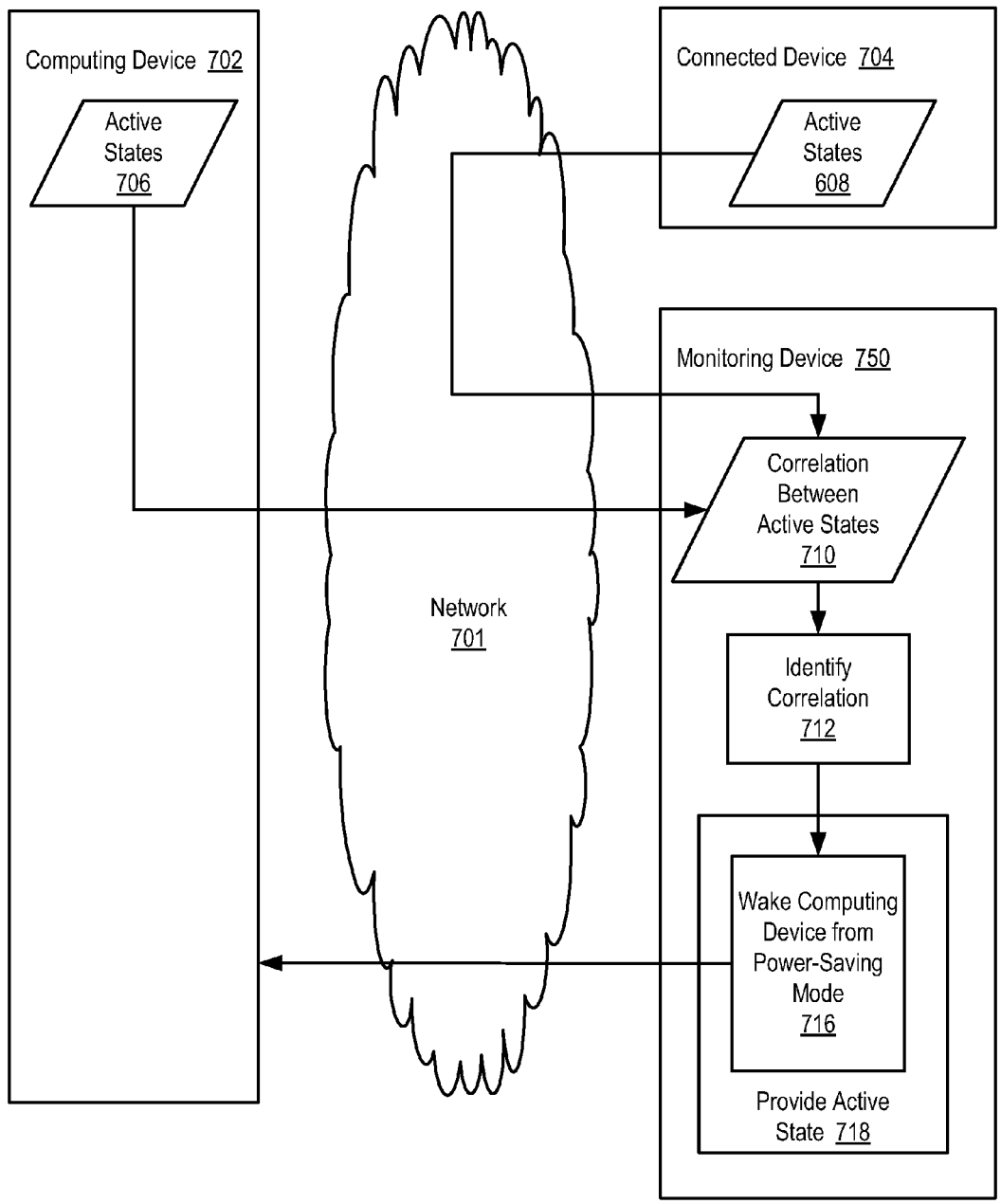

FIG. 7D is a data flow diagram illustrating one implementation of the method of FIG. 7A. The connected device and the computing device are connected to a monitoring device 750 on the network. In some instances, it is useful to have the monitoring device 750 execute the steps of identifying the correlation and providing an active state. For example, the monitoring device may have more computing resources or network resources than the computing device, and the network device or the monitoring device may not enter a power-saving mode, making executing the steps of the presently disclosed method on the monitoring device the most practical design. Thus, in the method of FIG. 7D, the step of identifying a correlation 710 between active states of the computing device 706 and active states of a connected device 708 (block 712) is carried out at least in part on the monitoring device 750. Active states data from the computing device and connected devices may be retrieved by requesting a data packet containing active states data from the respective devices. Devices may alternatively compile active states data individually from communications between polling consoles as described above in reference to FIG. 5.

Figure 8:
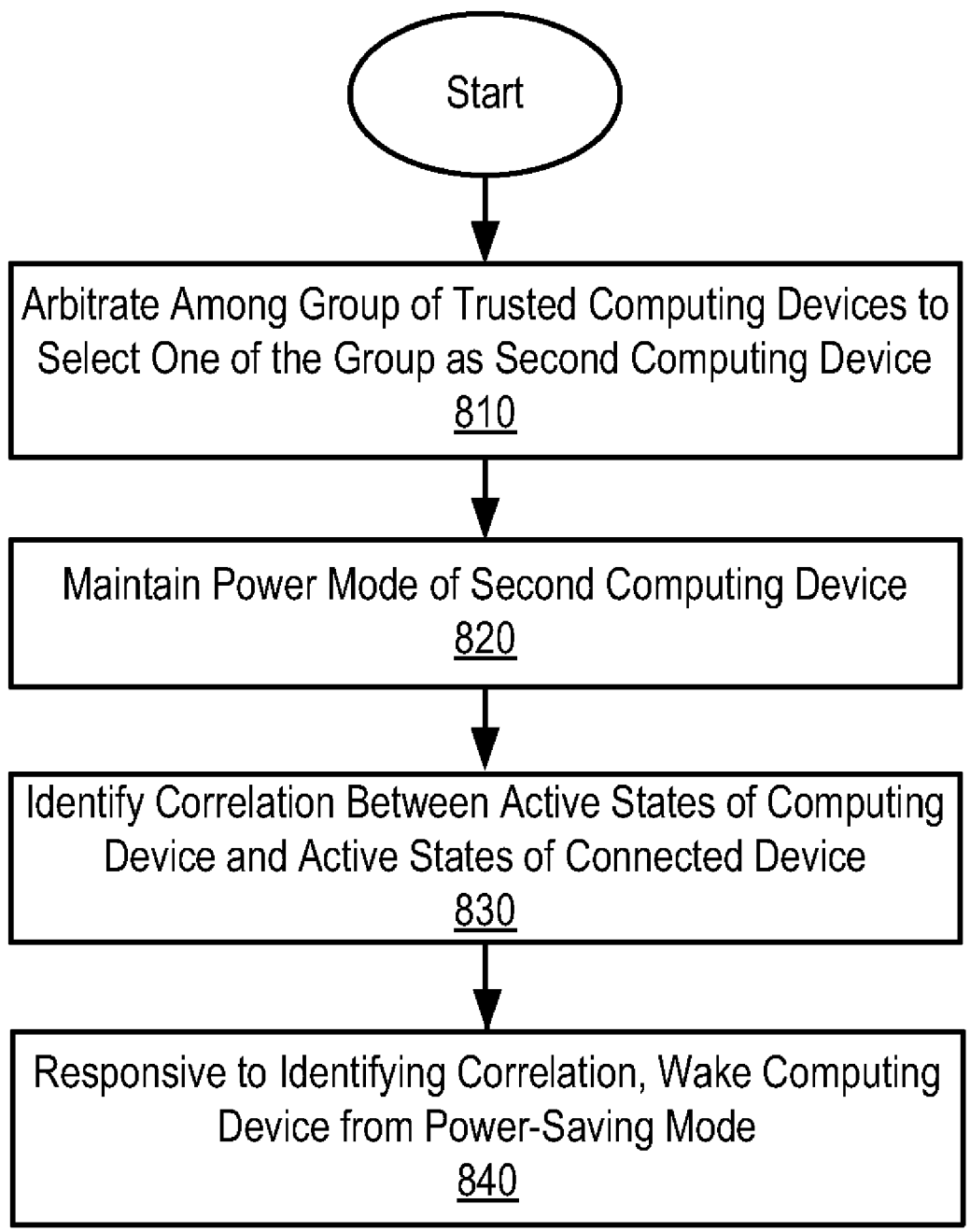
FIG. 8 illustrates another embodiment of a method for computing device power management in accordance with one aspect of the invention.

FIG. 8 is a flow chart illustrating one embodiment for a method of computing device power management in accordance with one aspect of the invention, wherein the monitoring device is one of a group of available trusted computing devices connected to the computing device and the connected device on the network. In some instances it may be desirable to dynamically determine which of a group of trusted computing devices functions as the monitoring device as discussed in reference to FIG. 7D in the immediately preceding paragraph. For example, a computing device scheduled to be active during a particular timeframe or having the lowest energy consumption might be the most efficient choice for monitoring correlations on other devices on the network.

Method 800 begins at step 810 by arbitrating among the group of available trusted computing devices to elect one of the group of available trusted computing devices as the monitoring device. Upon particular events, such as startup, one of the trusted devices may send an election datagram to the trusted devices stored in a trusted devices table. When one of the group of available trusted computing devices receives an election datagram, it examines the election criteria (which may also be included in the datagram or stored on the device). If the trusted computing device has better election criteria than the sender of the election datagram, the trusted computing device issues its own election datagram. When a trusted computing device receives an election datagram indicating that it wins an election, the trusted computing device enters the running election state. While in this state, the trusted computing device sends out an election request. The trusted computing device sends a predefined number of datagrams. If another trusted computing device does not respond with an election datagram that wins the election, the computer is elected.

The devices may elect the monitoring device randomly or according to priorities such as efficiency, general networking capacity, software version recency, particular connected devices, general computing capacity, and so on. These devices may also require identification by MAC address, authentication, or other security measures well known in the prior art.

Step 820 includes maintaining the power mode of the monitoring device, which may be carried out similarly to the methods for preventing entering a power-saving mode discussed above with reference to FIG. 5. In step 830, the monitoring device identifies a correlation between active states of the computing device and active states of a connected device. In step 840, responsive to identifying the correlation, the monitoring device wakes the computing device from the power-saving mode. Steps 830 and 840 may be implemented in any of the ways described above.

Waking a Connected Device from a Network Device

Figure 9A:
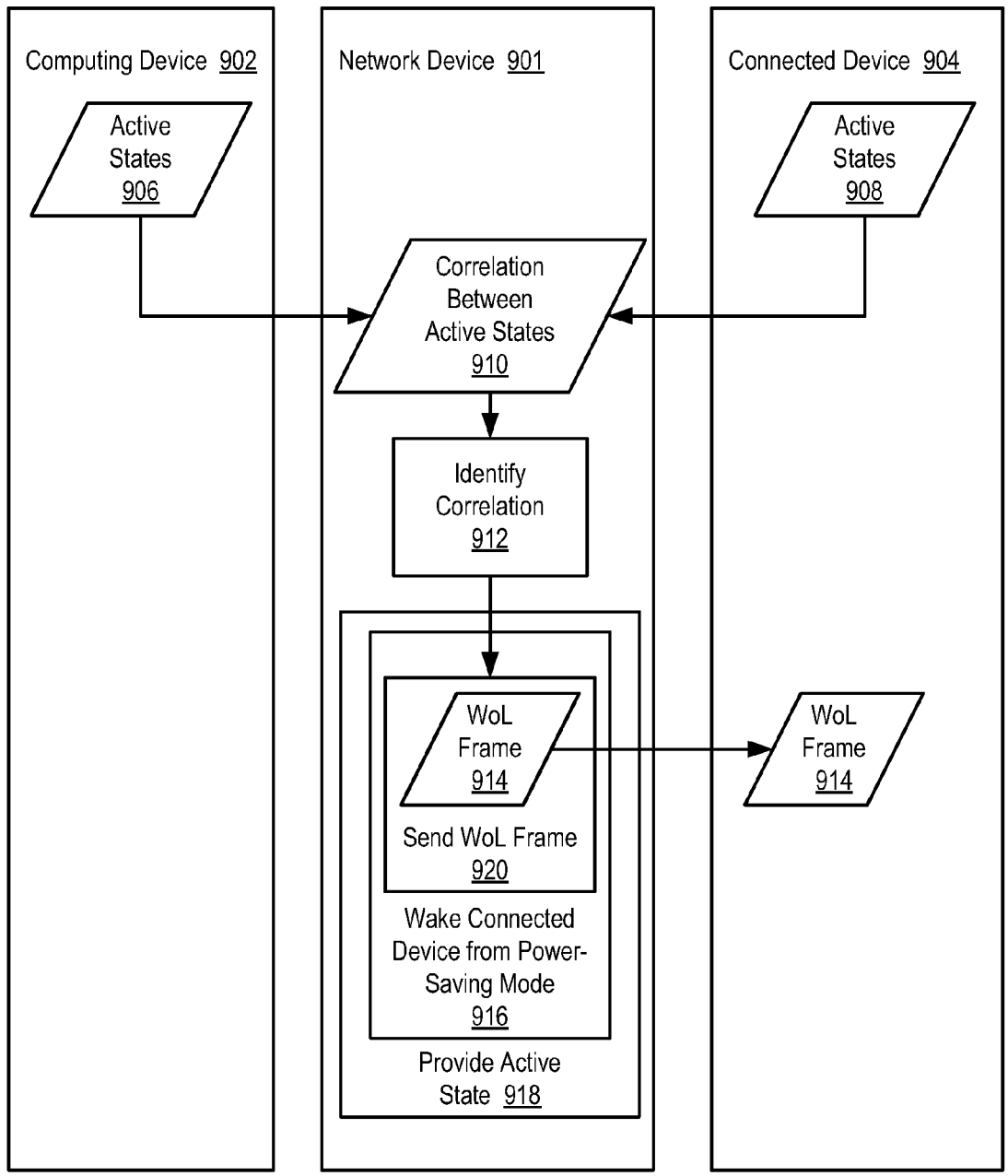
FIGS. 9A-B illustrates another embodiment of a method for computing device power management in accordance with one aspect of the invention.
Figure 9B:
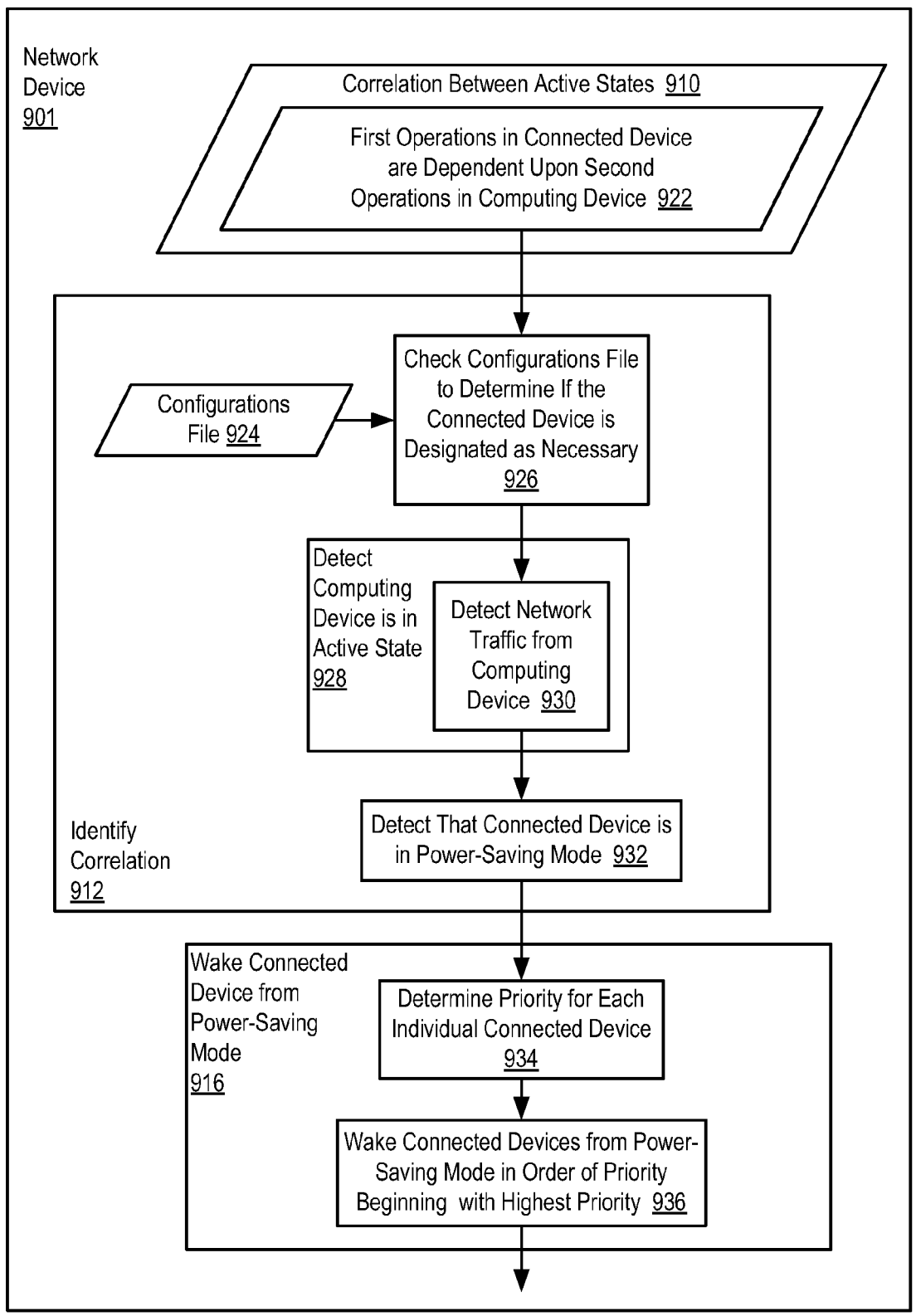

In the method of FIGS. 9A and 9B, a network device may detect early activity from a waking computing device and respond by waking connected devices on which the computing device depends before the computing device is fully functional. By incorporating aspects of the present invention on the network device, necessary connected devices are available more quickly than if requested by the waking computing device after becoming functional.

FIG. 9A is a data flow diagram illustrating one embodiment for a method of computing device power management in accordance with one aspect of the invention. The method of FIG. 9A includes identifying a correlation 910 between active states of the computing device 906 and active states of a connected device 908 (block 612), wherein the connected device 904 is connected to the computing device 902 through a network device 901.

The method further includes providing an active state (block 918). The step of providing an active state (block 918) is carried out by, responsive to identifying the correlation (block 912), waking the connected device 904 from the power-saving mode (block 916). Waking the connected device 904 from the power-saving mode (block 916) may be carried out by sending a Wake on LAN ('WoL') frame 908 to the connected device 904 (block 914) as described above with reference to FIG. 7A.

FIG. 9B illustrates identifying a correlation in accordance with one aspect of the invention. The correlation between active states 910 includes first operations in the computing device 902 being dependent upon second operations in the connected device 904 (block 922). Identifying correlation 922 (block 912) includes checking a configurations file 924 to determine if the connected device is designated as necessary (block 926). Identifying correlation 922 (block 912) further includes detecting that the computing device 902 is in an active state (block 928). Detecting that the computing device is in an active state (block 928) may be carried out by detecting network traffic from the computing device 902 (block 930). Identifying correlation 922 (block 912) further includes detecting that the connected device is in a power-saving mode (block 932).

FIG. 9B illustrates waking more than one connected device from the power-saving mode. Waking the connected device 904 from the power-saving mode (block 916) may be carried out by determining a priority for each individual connected device of the plurality of connected devices (block 934) and waking the plurality of connected devices from the power-saving mode in order of priority beginning with the highest priority (block 936). Priority may be determined as a function of the importance of the individual connected device to the computing device. Alternatively, priority may be a function of the amount of time after waking required for the individual connected device to be functional. For example, computing devices such as web servers typically have a longer start-up period before becoming functional than most other devices. Thus, the web server may have a higher priority, and therefore receive the first wake signal issued by the network device.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

We claim:

1. A method for power management of a computing device from a monitoring device, the method comprising:
    selecting the monitoring device from among a group of available trusted computing devices connected to the computing device and a connected device on a network;
    maintaining a power mode of the monitoring device;
    identifying, at the monitoring device, a correlation between active states of the computing device and active states of the connected device, wherein the connected device is connected to the computing device through the network, wherein the monitoring device is the connected device, wherein the identifying the correlation comprises:
        determining if the connected device has been designated in a calendar file as being dependent on the computing device;
        the monitoring device detecting that the connected device is active; and
        the monitoring device detecting that the computing device is in a power-saving mode, wherein the correlation comprises first operations in the connected device being dependent upon second operations in the computing device; and
    responsive to identifying the correlation, and the monitoring device detecting that the computing device is in the power-saving mode, the monitoring device waking the computing device from the power-saving mode.

2. The method of claim 1, wherein the identifying the correlation comprises:
    determining if the connected device has been designated in the calendar file as being dependent on the computing device for a specific period; and
    responsive to determining that the connected device has been designated as being dependent on the computing device for the specific period, determining that a current period is within the specific period.

3. A computer system for power management of a computing device from a monitoring device, the computer system comprising:
    one or more processors, one or more computer-readable memories, and one or more computer-readable tangible storage devices;
    program instructions, stored on at least one of the one or more storage devices for execution by at least one of the one or more processors via at least one of the one or more memories, to select the monitoring device from among a group of available trusted computing devices connected to the computing device and a connected device on a network;
    program instructions, stored on at least one of the one or more storage devices for execution by at least one of the one or more processors via at least one of the one or more memories, to maintain a power mode of the monitoring device,
    program instructions, stored on at least one of the one or more storage devices for execution by at least one of the one or more processors via at least one of the one or more memories, to identify a correlation between active states of the computing device and active states of a connected device, wherein the program instructions to identify the correlation comprise:
        determine if the connected device has been designated in a calendar file as being dependent on the computing device;
        detect that the connected device is active; and
        detect that the computing device is in a power-saving mode, wherein the correlation comprises first operations in the connected device being dependent on second operations in the computing device; and
    program instructions, stored on at least one of the one or more storage devices for execution by at least one of the one or more processors via at least one of the one or more memories, to wake the computing device from the power-saving mode responsive to identifying the correlation and responsive to detecting that the computing device is in the power-saving mode.

4. The computer system of claim 3, wherein the correlation comprises first operations in the connected device being dependent upon second operations in the computing device; and wherein the program instructions to identify the correlation:
    determine if the connected device has been designated in a calendar file as being dependent on the computing device for a specific period; and
    determine that a current period is within the specific period responsive to determining that the connected device has been designated as being dependent on the computing device for the specific period.

* * * * *